(12) United States Patent
Taguchi et al.

(10) Patent No.: US 11,536,515 B2
(45) Date of Patent: Dec. 27, 2022

(54) ROLLER SHAFT PORTION THERMAL INSULATION MEMBER FOR CONTINUOUS ANNEALING FURNACE AND CONTINUOUS ANNEALING FURNACE

(71) Applicant: MAFTEC CO., LTD., Chiyoda-ku (JP)

(72) Inventors: Masakuni Taguchi, Kitakyushu (JP); Mitsuo Suzuki, Chiyoda-ku (JP); Akihiro Yano, Chiyoda-ku (JP)

(73) Assignee: MAFTEC CO., LTD., Chiyoda-ku (JP)

( * ) Notice: Subject to any disclaimer, the term of this patent is extended or adjusted under 35 U.S.C. 154(b) by 121 days.

(21) Appl. No.: 16/944,232

(22) Filed: Jul. 31, 2020

(65) Prior Publication Data

US 2020/0363130 A1    Nov. 19, 2020

Related U.S. Application Data

(63) Continuation of application No. PCT/JP2019/004141, filed on Feb. 6, 2019.

(30) Foreign Application Priority Data

Feb. 6, 2018   (JP) .............................. JP2018-019476

(51) Int. Cl.
  *F27B 9/30* (2006.01)
  *C21D 9/40* (2006.01)
  (Continued)

(52) U.S. Cl.
  CPC .................. *F27B 9/30* (2013.01); *C21D 9/40* (2013.01); *F16C 13/02* (2013.01); *F27B 9/32* (2013.01)

(58) Field of Classification Search
  CPC ..... C21D 9/40; F27B 9/30; F27B 9/32; F16C 13/02
  (Continued)

(56) References Cited

U.S. PATENT DOCUMENTS 5,205,398 A  *  4/1993  Hart ....................... C03B 35/186
                                                    198/780
5,355,996 A  *  10/1994  Hart ........................ F27D 3/026
                                                    432/236
(Continued)

FOREIGN PATENT DOCUMENTS

CN       104073604 A      10/2014
CN       104088910 A      10/2014
(Continued)

OTHER PUBLICATIONS

International Search Report dated Apr. 16, 2019 in PCT/JP2019/004141 filed on Feb. 6, 2019, 2 pages.

(Continued)

*Primary Examiner* — Scott R Kastler
*Assistant Examiner* — Michael Aboagye
(74) *Attorney, Agent, or Firm* — Oblon, McClelland, Maier & Neustadt, L.L.P.

(57) ABSTRACT

Provided is a roller shaft insulation member for reducing the heat which is conducted to the bearings by passing through the space between the roller insertion hole of a continuous annealing furnace and the roller, wherein the roller shaft insulation member of the continuous annealing furnace comprises an inorganic fiber blanket, which contacts or is near the outer circumferential surface of the roller and in which the content of 45 μm or larger shot is 3% or less. A continuous annealing furnace provided with said roller shaft insulation member is also provided.

5 Claims, 6 Drawing Sheets

(51) Int. Cl.
*F27B 9/32* (2006.01)
*F16C 13/02* (2006.01)

(58) Field of Classification Search
USPC ............. 266/280; 198/780; 193/37; 532/236
See application file for complete search history.

(56) References Cited

U.S. PATENT DOCUMENTS

| | | | | |
|---|---|---|---|---|
| 5,378,219 | A * | 1/1995 | Hart | B65G 39/07 492/53 |
| 5,441,407 | A * | 8/1995 | Stamm | F27D 3/026 432/234 |
| 5,833,455 | A * | 11/1998 | Carr | C21D 9/38 29/895 |
| 8,622,188 | B2 * | 1/2014 | Yamaoka | F27B 9/24 29/895.21 |
| 8,932,968 | B2 * | 1/2015 | Lee | C04B 35/62245 501/36 |
| 2013/0071660 | A1 * | 3/2013 | Lee | C03C 3/093 428/401 |

FOREIGN PATENT DOCUMENTS

| | | |
|---|---|---|
| JP | 54-079547 U | 6/1979 |
| JP | 02-011154 U | 1/1990 |
| JP | 2006-010107 A | 1/2006 |
| JP | 2006-170254 A | 6/2006 |
| JP | 2014-020464 A | 2/2014 |
| JP | 2016-183784 A | 10/2016 |

OTHER PUBLICATIONS

Combined Chinese Office Action and Search Report dated Dec. 3, 2021 in Patent Application No. 201980009427.9 (with English machine translation), 13 pages.

* cited by examiner

ROLLER SHAFT PORTION THERMAL INSULATION MEMBER FOR CONTINUOUS ANNEALING FURNACE AND CONTINUOUS ANNEALING FURNACE

TECHNICAL FIELD

The present invention relates to a roller shaft portion thermal insulation member for a continuous annealing furnace and particularly relates to a roller shaft portion thermal insulation member that prevents heat from being transmitted from a portion between a roller insertion hole and a roller shaft portion on an end portion side of a roller to a bearing and/or that prevents lubricant leaking from a roller bearing from reaching the inside of a furnace along a roller shaft. The present invention also relates to a continuous annealing furnace that includes this roller shaft portion thermal insulation member.

BACKGROUND ART

A continuous annealing furnace is a furnace that sequentially accepts coil-shaped steel sheets into the inside of the furnace the atmosphere of which is set to a reducing atmosphere and transports the steel sheets with transport rollers (hearth rollers) while continuously annealing the steel sheets. As described in PTL 1, both longitudinal end portions (end portions in the roller axis direction) of each of the rollers that transports steel sheets extend to the outside of the furnace through roller insertion holes provided in respective furnace walls and are rotatably supported by bearings. Cylindrical members for preventing intra-furnace gas from flowing out are provided between a furnace body and the bearings so as to surround the end portions of the roller. Lubricant such as grease is supplied to the bearings.

For a related-art lining in the furnace for, for example, a continuous annealing treatment facility, a ceramic fiber having good characteristics is used as a light-weight fire proof material or a light-weight thermal insulation material (for example, PTL 2). A ceramic fiber is manufactured by fiberizing a ceramic material in a high-temperature molten state by a spinning method that utilizes the centrifugal force or a blowing method that blows with high-speed compressed air. This ceramic fiber contains non-fibrous particles that have not been able to be fiberized and remain in a particulate state, that is, shots. The shots are the cause of dust particles.

CITATION LIST

Patent Literature

PTL 1: Japanese Unexamined Patent Application Publication No. 2006-170254
PTL 2: Japanese Unexamined Patent Application Publication 2006-10107

SUMMARY OF INVENTION

Technical Problem

The temperature of the continuous annealing furnace is increased to high temperatures (for example, 1000° C.). Thus, the high-temperature intra-furnace gas flows into the bearings through gaps between the end portions of the hearth roller and the roller insertion holes, and accordingly, heat of the intra-furnace gas causes the grease to evaporate and carbonize, or the high-temperature intra-furnace gas causes the grease to leak from the roller bearings and reach the inside of the furnace along the roller shaft, resulting in carbonization of the grease. This causes soot to fly in the furnace and adhere to the steel sheets being transported, resulting in a surface defect such as non-plating in a downstream plating process (paragraph [0005] in PTL 1). Furthermore, energy that is originally intended to heat the steel sheets is applied to the soot, and accordingly, there arises problems such as degradation of heating efficiency and the like.

Although provision of a seal disc for preventing flowing of the intra-furnace gas into the bearings is described in PTL 1, the details of elements of the seal disc are not described in PTL 1.

An object of the present invention is to provide a roller shaft portion thermal insulation member for preventing heat of high-temperature intra-furnace gas of a continuous annealing furnace from being transmitted to a roller bearing and/or preventing lubricant leaking from the roller bearing from reaching the inside of the furnace along a roller shaft and to provide a continuous annealing furnace that includes this roller shaft portion thermal insulation member.

Solution to Problem

The gist of the present invention is as follows.

[1] A roller shaft portion thermal insulation member for a continuous annealing furnace provided between a roller insertion hole and a roller bearing of the continuous annealing furnace, the roller shaft portion thermal insulation member comprising:

at least one inorganic fiber blanket which is in contact with an outer circumferential surface of a roller or which is disposed near the outer circumferential surface of the roller and a percentage shot content of which for a shot of 45 μm or greater is 3% or smaller, wherein a remaining thickness of the at least one inorganic fiber blanket after cycle testing at 1000° C. is 70% or greater.

[2] The roller shaft portion thermal insulation member for a continuous annealing furnace according to [1], wherein a maximum load for the inorganic blanket is 5.0 kgf or greater under following measurement conditions:
[The Measurement Conditions]
a penetrated portion is formed, with a cork borer (an inner diameter of 14 mm), at a position 40 mm from a distal end in a laterally central portion of a sample of the inorganic blanket (210 mm in length and 80 mm in width), a bar having an inner diameter of 12 mm is inserted through the penetrated portion, a side end surface farther away from the penetrated portion is secured, and a load at which the sample breaks (maximum load) is measured when the bar is moved upward in a longitudinal direction of the sample while the bar is maintained in a horizontal direction.

[3] The roller shaft portion thermal insulation member for a continuous annealing furnace according to [1], wherein the at least one inorganic fiber blanket is at least one alumina fiber blanket.

[4] The roller shaft portion thermal insulation member for a continuous annealing furnace according to [2], wherein a mullite crystallization rate of an alumina fiber included in the at least one alumina fiber blanket is 85% or smaller.

[5] The roller shaft portion thermal insulation member for a continuous annealing furnace according to any one of [1] to [4], further comprising: a casing that is coupled to a furnace wall or a roller bearing support member and that includes a drum portion which surrounds the outer circumferential surface of the roller, wherein the at least one inorganic fiber blanket is held along an inner circumferential surface of the drum portion of the casing.

[6] The roller shaft portion thermal insulation member for a continuous annealing furnace according to [5], wherein the at least one inorganic fiber blanket includes a plurality of the inorganic fiber blankets, wherein each of the plurality of inorganic fiber blankets has a ring shape, and wherein the plurality of ring-shaped inorganic fiber blankets that are coaxially layered are attached to the casing.

[7] The roller shaft portion thermal insulation member for a continuous annealing furnace according to [5], wherein the at least one inorganic fiber blanket includes a plurality of the inorganic fiber blankets, wherein each of the plurality of inorganic fiber blankets has a plate shape, wherein the plurality of inorganic fiber blankets are arranged in a circumferential direction along the inner circumferential surface of the drum portion such that a plate surface of each of the plurality of inorganic fiber blankets is set in a direction parallel to an axial direction of the drum portion, and wherein
the casing includes a fastening mechanism that adjusts a distance between a roller shaft and the roller shaft portion thermal insulation member.

[8] A continuous annealing furnace comprising: the roller shaft portion thermal insulation member according to any one of [1] to [7].

Advantageous Effects of Invention

When the roller shaft portion thermal insulation member that includes the inorganic fiber blanket the percentage shot content of which is 3% or smaller for shots of 45 μm or greater and the remaining thickness of which is 70% or greater after the cycle testing at 1000° C. is provided between the roller insertion hole and the roller, inflow of the intra-furnace heat can be prevented. As a result, the increase in temperature of the bearing is suppressed, and generation of soot due to carbonization of the grease is prevented. This prevents the occurrences of a surface defect such as non-plating, and the frequency of cleaning work inside the furnace for removing the accumulated soot can be reduced.

Furthermore, as the material of the roller shaft portion thermal insulation member, the inorganic fiber blanket the percentage shot content of which for shots of 45 μm or greater is 3% or smaller is used. Thus, particulate foreign matter derived from the inorganic fiber blanket does not move into the furnace. This is preferable because the steel sheets or the roller is not scratched by the foreign matter. Also, even when rotation is performed while the roller shaft is in contact with the roller shaft portion thermal insulation member, the roller shaft is only ground without formation of large scratches. This is preferable because the roller shaft is not degraded. Since the inorganic fiber blanket the remaining thickness of which after the cycle testing at 1000° C. is 70% or greater is used, the dimensions are unlikely to be changed by movement such as runout of the roller under the high temperature conditions. As a result, this is preferable because a gap is unlikely to be formed between the roller and the insulation member.

Furthermore, when soot moves into the furnace, the soot deprives of energy that is originally intended to heat the steel sheets. However, since the movement of the soot is prevented, reduction in heat efficiency can be prevented.

DESCRIPTION OF EMBODIMENTS

Figure 1:
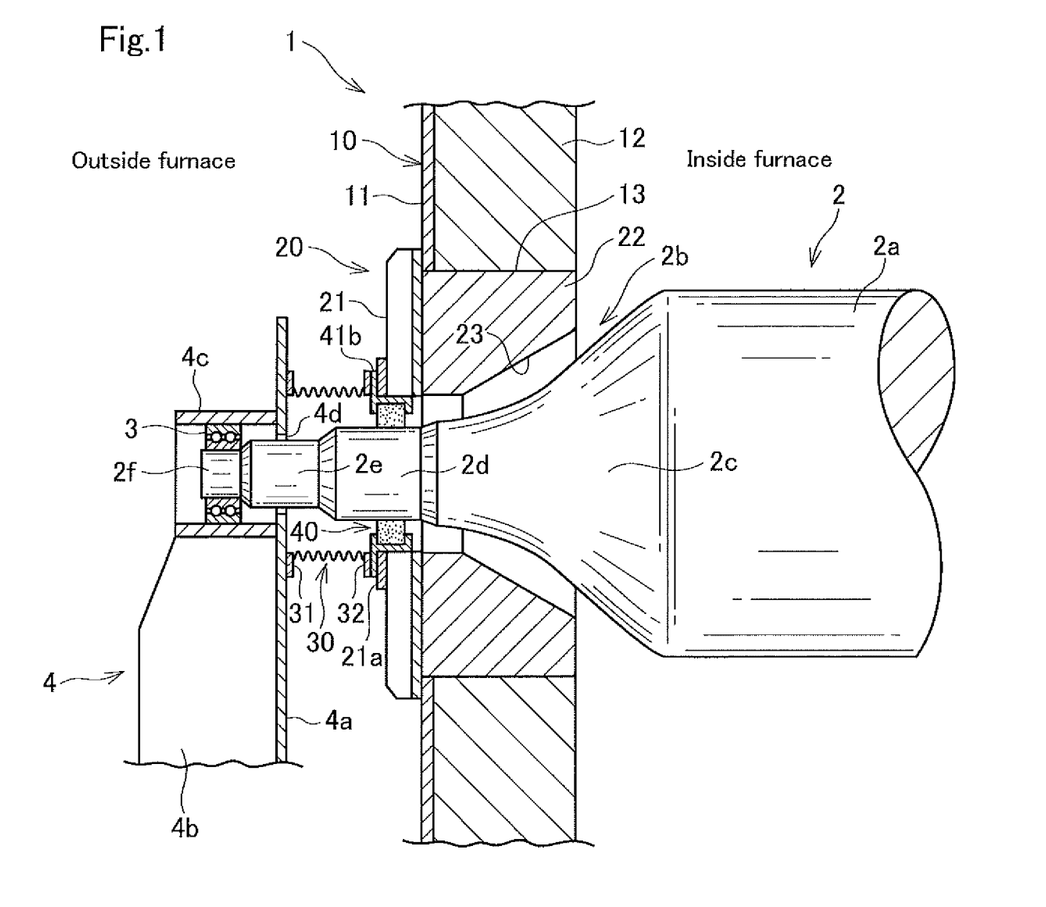
FIG. 1 is a longitudinal sectional view of a region near a roller shaft portion of a continuous annealing furnace according to an embodiment.

An embodiment will be described below with reference to the drawings. FIG. 1 illustrates a longitudinal sectional view of a region near a roller shaft portion of a continuous annealing furnace 1 according to a first embodiment.

The continuous annealing furnace 1 includes many horizontally disposed rollers 2 for transporting steel sheets to be treated. Each of the rollers 2 includes a large diameter portion 2a and roller shaft portions 2b. The large diameter portion 2a has a uniform diameter. The roller shaft portions 2b are disposed on both end sides of the large diameter portion 2a. Each of the roller shaft portions 2b has a tapered portion 2c and equal diameter portions 2d, 2e, 2f. The diameter of the tapered portion 2c gradually reduces from the large diameter portion 2a toward a corresponding one of the ends. The equal diameter portions 2d, 2e, 2f are disposed further toward the end than the tapered portion. The diameter of the equal diameter portions 2d, 2e, 2f reduces in this order. The equal diameter portion 2f is supported by a roller support member 4 with a bearing 3 interposed therebetween. Grease is supplied to the bearing 3 through an injection tube (not illustrated).

The roller support member 4 includes a first plate 4a, a second plate 4b, and a bearing holding housing 4c. The first plate 4a faces a furnace body 1. The second plate 4b perpendicularly intersects the first plate 4a. A roller insertion opening 4d is provided in the first plate.

A furnace body side wall 10 of the continuous annealing furnace 1 includes an outer steel shell 11 and a ceramic fiber liner 12 provided inside the outer steel shell 11.

A liner block 20 is mounted at an opening 13 provided in the furnace body side wall 10. The liner block 20 includes an outer steel shell 21 and a ceramic fiber liner 22 provided on the intra-furnace side relative to the outer steel shell 21. A roller insertion hole 23 is provided so as to penetrate through the liner 22 and the outer steel shell 21. A seat plate 21a that includes an annular steel sheet is secured to the outer steel shell 21 at a region around the roller insertion hole 23.

The roller insertion hole 23 has a reverse-tapered shape on an intra-furnace side thereof where the diameter of the roller insertion hole 23 increases toward the intra-furnace side and is a cylindrical hole having a uniform diameter on an extra-furnace side thereof. The roller shaft portion 2b extends to the outside of the furnace through the roller insertion hole 23.

A cylindrical cover 30 is provided so as to surround part of the roller shaft portion 2b that extends from the roller insertion hole 23 to the outside of the furnace. The cylindrical cover 30 has a bellows shape that can expand and contract in a cylinder axis direction. A first flange 31 provided on one end side of the cylindrical cover 30 is attached to the first plate 4a of the roller support member 4 by using, for example, a bolt and nut.

A second flange 32 provided on the other end side of the cylindrical cover 30 is attached to the seat plate 21a of the outer steel shell 21 by using, for example, a bolt and nut. According to the present embodiment, a flange portion 41b of a roller shaft portion thermal insulation member 40 is held between the second flange 32 and the seat plate 21a.

Figure 4:
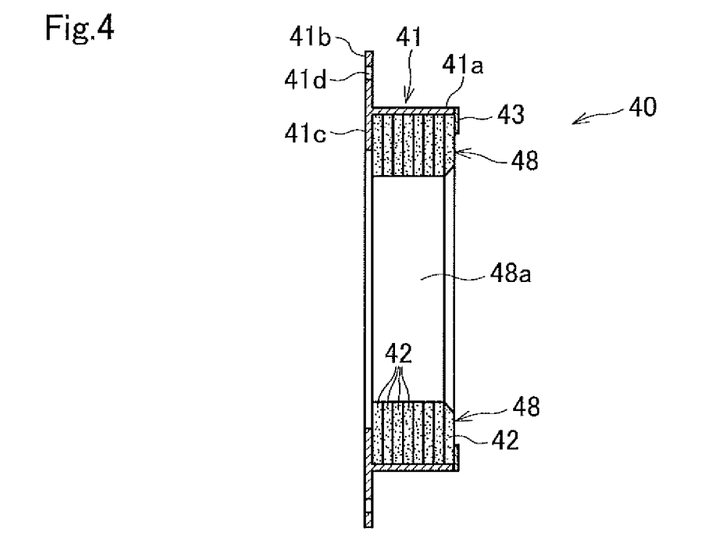
FIG. 4 is a longitudinal sectional view of a roller shaft portion thermal insulation member according to the embodiment.
Figure 5:
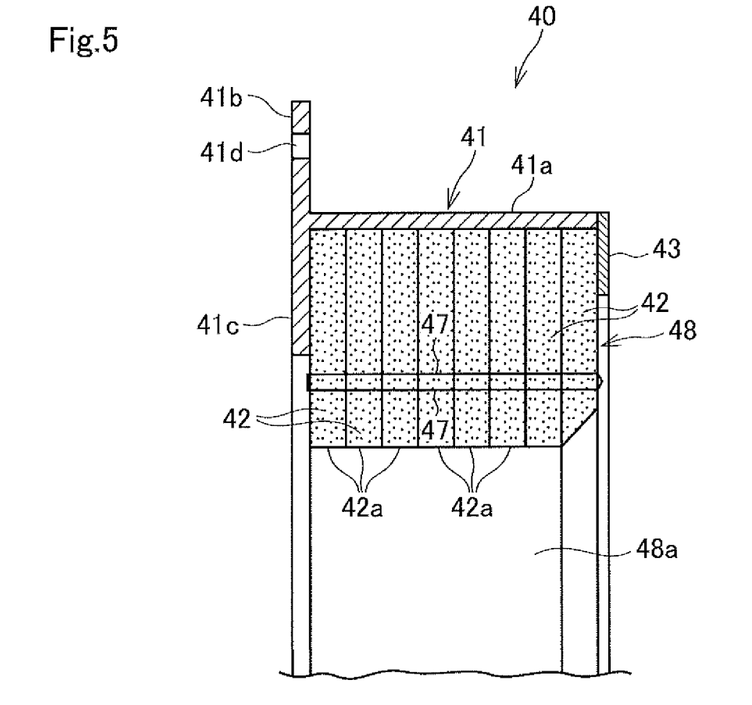
FIG. 5 is an enlarged view of part of FIG. 4.

As illustrated in FIGS. 4 and 5, according to the present embodiment, the roller shaft portion thermal insulation member 40 includes a casing 41, inorganic fiber blankets 42 held by the casing 41, and so forth. The casing 41 includes a drum portion 41a, the flange portion 41b, a stopper portion 41c, and a holding ring 43. The drum portion 41a has a cylindrical shape. The flange portion 41b radially (outwardly) projects from one end of the drum portion 41a. The inward directed stopper portion 41c projects inward from the one end of the drum portion 41a in the cylinder axis direction. The holding ring 43 is detachably attached to the other end of the drum portion 41a in the cylinder axis direction by using a screw or the like.

Bolts (not illustrated) are inserted through bolt insertion holes 41d provided in the flange portion 41b. These bolts are also inserted through bolt insertion holes (not illustrated) provided in the second flange 32 of the cylindrical cover 30 and the seat plate 21a of the outer steel shell 21, and nuts are screwed onto the bolts. Thus, the flange portion 41b is held between the second flange 32 and the seat plate 21a, and the roller shaft portion thermal insulation member 40 is secured to the liner block 20.

According to the present embodiment, each of the inorganic fiber blankets 42 has a ring-shaped (annular) disc shape. A plurality of the inorganic fiber blankets 42 are coaxially superposed on each other and sewn by ropes 47 formed of alumina fiber so as to be integrated with each other. Thus, an inorganic fiber blanket layered body 48 is formed. One end surface of this inorganic fiber blanket layered body 48 in a layered direction is superposed on the stopper portion 41c, and an outer periphery of the other end surface of the inorganic fiber blanket layered body 48 is held by the holding ring 43. Thus, the inorganic fiber blanket layered body 48 is held by the casing 41.

The inorganic fiber blankets 42 are superposed on each other such that an inner circumferential surfaces 42a of the inorganic fiber blankets 42 are coaxially aligned with each other. Thus, the inorganic fiber blanket layered body 48 has a cylindrical inner hole 48a. A monolithic refractory such as mortar may be applied between the inorganic fiber blankets 42 so as to form monolithic refractory layers. Providing the monolithic refractory layers between the inorganic fiber blankets 42 is preferable because bonding strength between the inorganic fiber blankets 42 is improved and the grease volatilized outside the furnace or soot generated outside the furnace is prevented from moving into the inside of the furnace. Furthermore, shield layers such as metal plates may be provided between the inorganic fiber blankets 42. Providing the shield layers between the inorganic fiber blankets 42 is preferable because the grease volatilized outside the furnace or the soot generated outside the furnace is prevented from moving into the inside of the furnace.

The roller shaft portion 2b is inserted through the inner hole 48a of the inorganic fiber blanket layered body 48. An inner circumferential surface of the inner hole 48a is elastically pressed against an outer circumferential surface of the roller shaft portion 2b (small diameter portion 2c according to the present embodiment).

In the continuous annealing furnace 1 that includes the roller shaft portion thermal insulation member 40 configured as described above, even when high-temperature intra-furnace gas moves into the roller shaft portion insertion hole 23, the roller shaft portion thermal insulation member 40 prevents flowing of the high-temperature intra-furnace gas further toward the bearing 3 side. Thus, an increase in temperature of the bearing 3 is suppressed, and accordingly, vaporization and carbonization of the grease is prevented.

Even when part of the intra-furnace gas flows further toward the cover 30 than the roller shaft portion thermal insulation member 40, the amount of this intra-furnace gas is small and this intra-furnace gas is cooled by thermal dissipation from the cover 30. Thus, the increase in temperature of the bearing 3 is suppressed.

Furthermore, with this roller shaft portion thermal insulation member 40, even when an evaporated substance of the grease flows from the bearing 3 into the cover 30, the roller shaft portion thermal insulation member 40 prevents the flowing of the evaporated material toward the intra-furnace side. This prevents generation of a grease carbonized substance in the furnace. Furthermore, since the roller shaft portion thermal insulation member 40 absorbs the liquefied grease flowing in along the roller, generation of the grease carbonized substance is prevented.

Referring to FIG. 1, the drum portion 41a of the roller shaft portion thermal insulation member 40 is disposed further in the intra-furnace direction than the flange portion 41b. However, as illustrated in FIG. 2, the drum portion 41a may be disposed further in the extra-furnace direction than the flange portion 41b.

Figure 3:
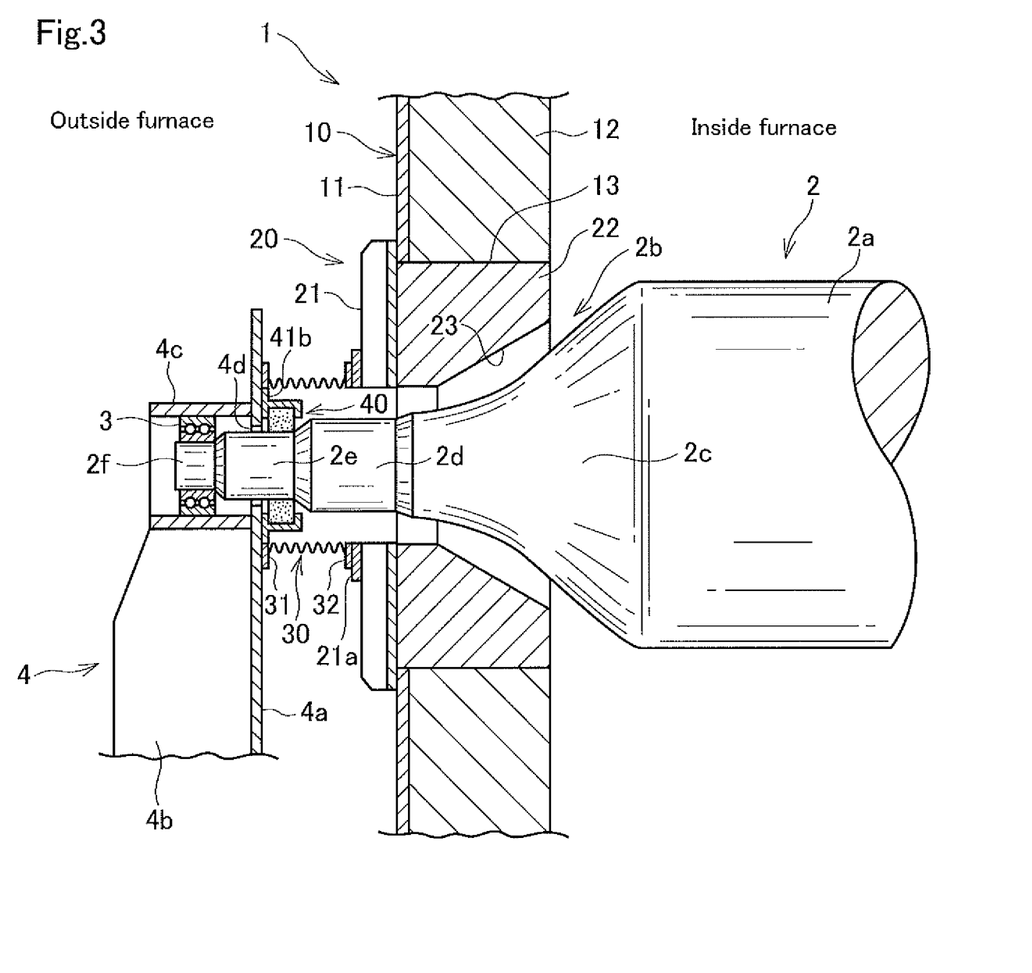
FIG. 3 is a longitudinal sectional view of the region near the roller shaft portion of the continuous annealing furnace according to the embodiment.

Furthermore, as illustrated in FIG. 3, the roller shaft portion thermal insulation member 40 may be attached to the first plate 4a of the roller support member 4 according to the present invention.

Figure 2:
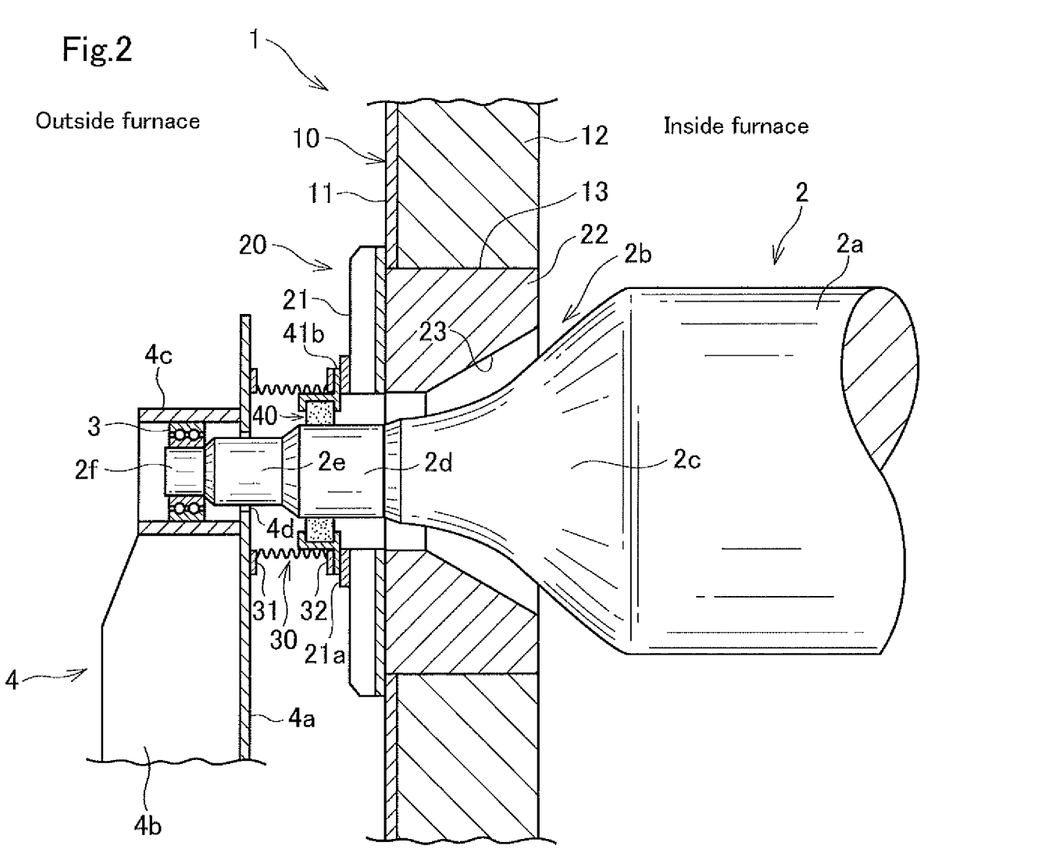
FIG. 2 is a longitudinal sectional view of the region near the roller shaft portion of the continuous annealing furnace according to the embodiment.

Other structures illustrated in FIGS. 2 and 3 are similar to those illustrated in FIG. 1, and the same reference numerals denote the same parts.

Referring to FIGS. 4 and 5, plate surfaces of the inorganic fiber blankets 42 are perpendicular to the axis of the inner hole 48a. However, the present invention is not limited to this. For example, according to the present invention, as is the case with a roller shaft portion thermal insulation member 40' illustrated in FIGS. 6 to 9, plate surfaces of an inorganic fiber blankets 42' may be parallel to the axis of the drum portion 41a.

Referring to FIGS. 6 to 9, the inorganic fiber blankets 42' have a rectangular plate shape and are layered in a circumferential direction of an inner circumferential surface of the drum portion 41a. The thickness of each of the inorganic fiber blankets 42' is larger on an outer circumferential side than on an inner circumferential side. The layered inorganic fiber blankets 42' are bound by the ropes 47 formed of alumina fiber so as to be integrated with each other. Thus, a cylindrical inorganic fiber blanket layered body 48' is formed.

Figure 9:
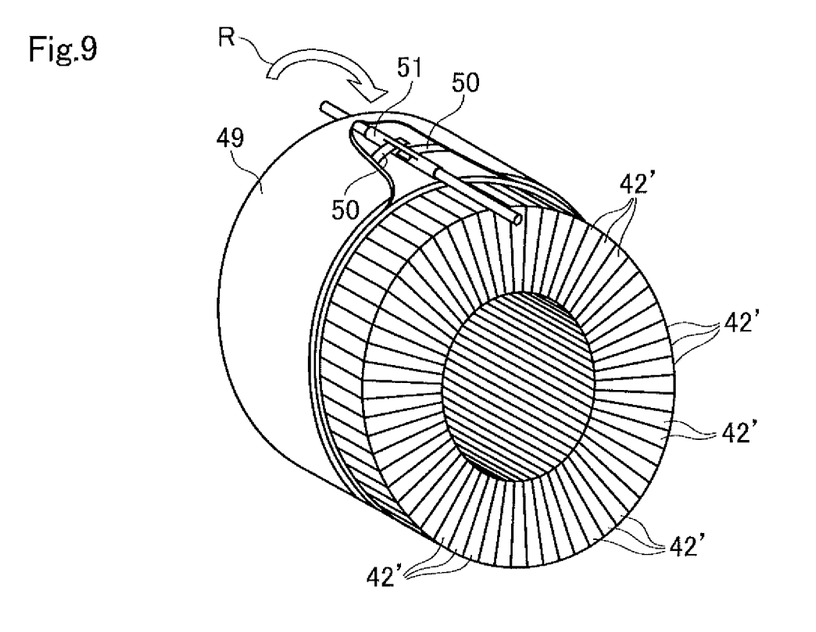
FIG. 9 is a perspective view illustrating the roller shaft portion thermal insulation member illustrated in FIGS. 6 and 7 during manufacturing.

As illustrated in FIG. 9, an inorganic fiber sheet 49 is wound around an outer circumference of this cylindrical inorganic fiber blanket layered body 48', and a fastening band 50 is wound around an outer circumference of the inorganic fiber sheet 49. Both ends of this fastening band 50 are inserted through a slot (elongated hole) of a fastening rod 51. When the fastening rod 51 is rotated about the axis of the rod as illustrated by an arrow R, both the ends of the fastening band 50 are wound up around the rod 51 so as to fasten the inorganic fiber blanket layered body 48' by the fastening band 50. Thus, when a hearth roller is displaced by expansion or contraction, following in accordance with the fastening is possible, and accordingly, the gap between the roller shaft and the roller shaft portion thermal insulation member can be reduced as much as possible. The inorganic fiber sheet 49 is folded back so as to be superposed on an outer circumferential side of the fastening band 50.

Figure 6:
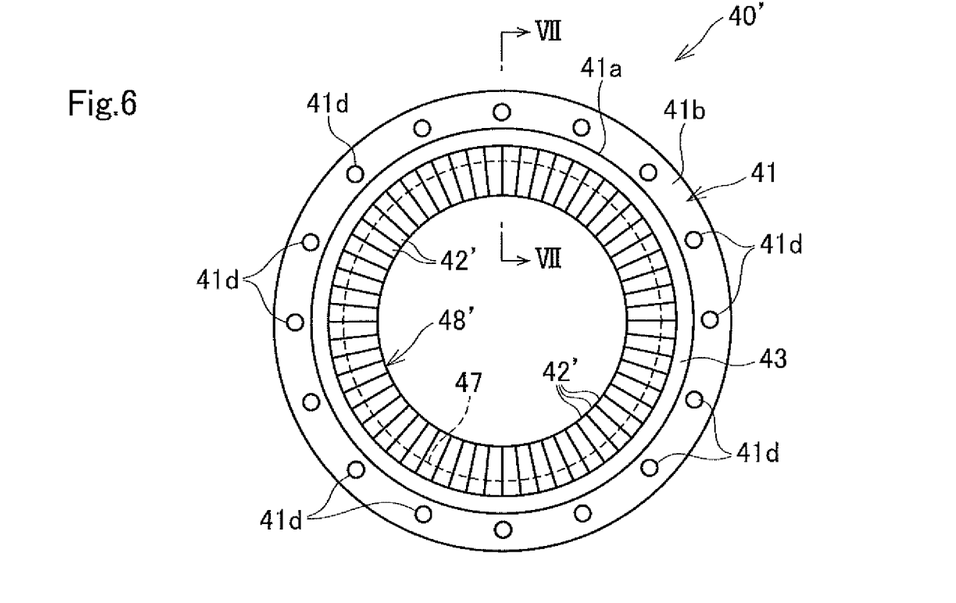
FIG. 6 is a front view of the roller shaft portion thermal insulation member according to the embodiment.
Figure 7:
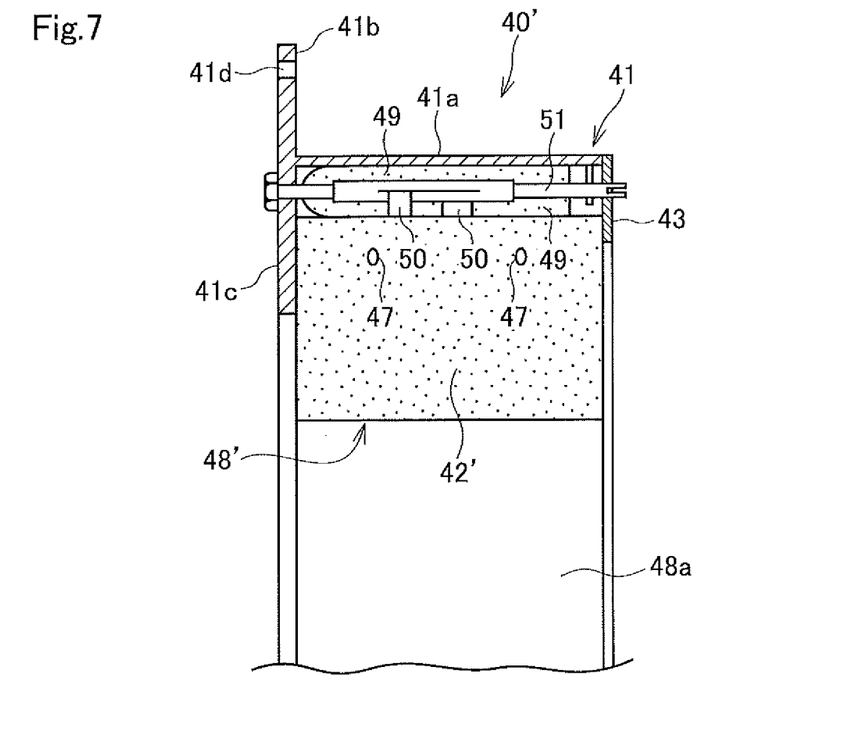
FIG. 7 is a sectional view taken along line VII-VII illustrated in FIG. 6.
Figure 8:
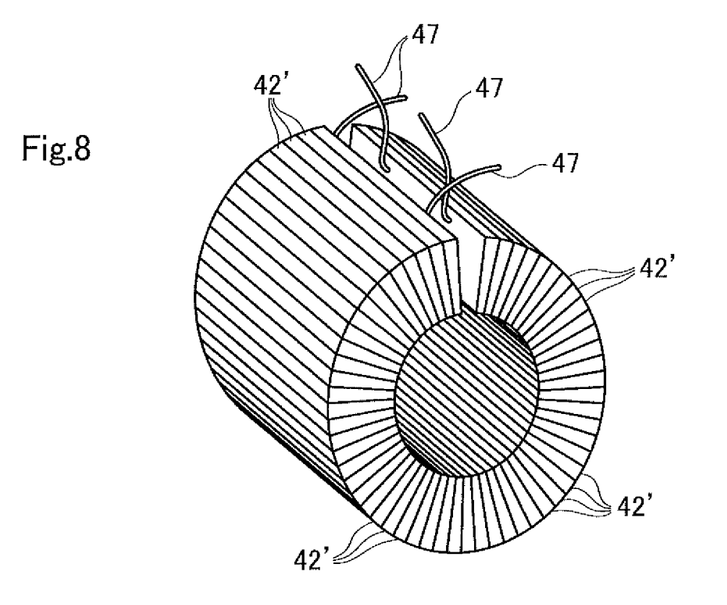
FIG. 8 is a perspective view illustrating the roller shaft portion thermal insulation member illustrated in FIGS. 6 and 7 during manufacturing.

As illustrated in FIGS. 6 and 7, as is the case with the inorganic fiber blanket layered body 48, the inorganic fiber blanket layered body 48' is held by the casing 41. As illustrated in FIG. 7, the fastening rod 51 extends between the stopper portion 41c and the holding ring 43 of the casing 41.

Other structures illustrated in FIGS. 6 to 9 are similar to those illustrated in FIGS. 4 and 5, and the same reference numerals denote the same parts.

Although the inner circumferential surface of the inner hole 48a of the inorganic fiber blanket layered body 48, 48' is in contact with the outer circumferential surface of the roller shaft portion 2b according to the above description, a slight clearance (preferably 10 mm or smaller, more preferably 5 mm or smaller, and especially preferably 3 mm or smaller) may exist between the inner circumferential surface of the inner hole 48a and the outer circumferential surface of the roller shaft portion 2b.

According to the present invention, the inorganic fiber blankets are preferably alumina fiber blankets. Next, an alumina fiber blanket preferably used according to the present invention is described. The percentage shot content of this alumina fiber blanket for shots of 45 μm or greater is 3% or smaller and a remaining thickness of the inorganic fiber blanket after cycle testing at 1000° C. is 70% or greater.

Preferably, particulate foreign matter of 45 μm or greater that affects scratching of steel sheets in the continuous annealing furnace does not exist. Thus, the percentage shot content for shots of 45 μm or greater of the alumina fiber blanket is preferably 3% or smaller and particularly preferably 2% or smaller. The percentage shot content for shots of 45 μm or greater contained in the alumina fiber blanket is measured with a sieve of 45 μm of 325 mesh in accordance with measurement of the percentage shot content included in JIS R 3311 Ceramic fiber blanket (sieve, nominal size 212 μm specified in JIS Z 8801).

Preferably, the alumina fiber blanket used for the present invention substantially does not include a fiber having a fiber diameter of 3 μm or smaller. Preferably, the alumina fiber blanket used for the present invention has undergone a needling process. Use of this needle blanket is also preferable in terms of load carrying. Here, the term "substantially does not include a fiber having a fiber diameter of 3 μm or smaller" means that the weight percentage of a fiber having a fiber diameter of 3 μm or smaller is 0.1 wt % or smaller of the total weight of the fiber.

An average fiber diameter of the alumina fiber that forms the alumina fiber blanket used for the present invention is preferably 5 to 7 μm. When the average fiber diameter of the alumina fiber is excessively large, the repulsive force and toughness of the blanket are lost. When the average fiber diameter of the alumina fiber is excessively small, the amount of dusting flowing in the air increases and the probability of including a fiber having a fiber diameter of 3 μm or smaller increases.

An alumina/silica composition ratio (wt %) of the alumina fiber included in the alumina fiber blanket used for the present invention is preferably in a range 65-98/35-2, more preferably in a range 68-85/32-15, further more preferably in a range 70-80/30-20, and especially preferably in a range 70-76/30-24. Furthermore, although a mullite crystallization rate of the alumina fiber (the rate of mullite ($3Al_2O_3 \cdot 2SiO_2$) in the alumina fiber) included in the alumina fiber blanket used for the present invention is not particularly limited, this rate is normally 85% or smaller, preferably 75% or smaller, more preferably 60% or smaller, further more preferably 30% or smaller, particularly preferably 20% or smaller, and especially preferably 10% or smaller. The mullite crystallization rate is measured as follows. A measurement sample is ground in a mortar, this measurement sample is measured at a tube voltage of 30 kv, a tube current of 40 mA, and a speed of 4°/minute by using an X-ray diffraction instrument (manufactured by, for example, Rigaku Corporation), and a peak height h at a peak of mullite $2\theta=26.3°$ is read. Furthermore, under the same conditions, the measurement is performed on a reference item (for example, a mullite reference material (certified reference material of the Ceramic Society of Japan, JCRM-R041) or an alumina fiber (such as a fiber made by heat treating (alumina:silica=72:28, mullite crystallization rate of 65 to 75%) at 1500° C. for 8 hours), and the peak height $h_0$ at a peak of $2\theta=26.3°$ is read. The mullite crystallization rate at this time is a value represented by the following expression:

$$\text{mullite crystallization rate} = h/h_0.$$

Setting the mullite crystallization rate in the above-described ranges is preferable because thermal insulation, workability, and a cushioning property can be obtained.

Examples of such an alumina fiber blanket include MAFTEK (registered trademark) manufactured by Mitsubishi Chemical Corporation.

The thickness of the alumina fiber blanket used for the present invention is preferably 6 to 25 mm and more preferably 7 to 13 mm. The shrinkage percentage of the alumina fiber blanket (a measurement method is in accordance with JIS R 3311) under the conditions in which the temperature has been increased at 5° C./min and then held at 1500° C. for 8 hours is preferably smaller than 1%.

The basis weight of the alumina fiber blanket used for the present invention is preferably 1000 to 3000 g/m², more preferably 1200 to 2800 g/m², and especially preferably 1400 to 2500 g/m².

According to the present invention, the remaining thickness of the inorganic fiber blanket such as an alumina fiber blanket is 70% or greater, preferable 75% or greater, more preferably 80% or greater, further more preferably 85% or greater, particularly preferably 90% or greater, and especially preferably 96% or greater after the cycle testing at 1000° C. performed with the measurement method described below.

Measurement method: A plurality of samples having a size of 10 mm in length and 50 mm in width cut out from an inorganic blanket are adjusted, arranged such that cut end surfaces of the samples face outward, and sewn with an alumina thread. Thus, an integrated sample (45 mm in length×50 mm in width×10 mm in height) is fabricated. The sample is compressed for 30 minutes with the height of the sample set to 8.25 mm. Then, the temperature of upper and lower plates is increased to 1000° C. and compression from a height of 9.5 mm (release side) to a height of 7 mm (compressed side) is repeated 800 times. The remaining thickness before and after the measurement is used to calculate the percentage (%) of the thickness of the inorganic fiber blanket after the measurement relative to the thickness of the inorganic fiber blanket before the measurement.

When the remaining thickness is within the above-described ranges, even in the case where vibration generated by operation of the furnace is applied, the repulsive force of the inorganic fiber blankets is maintained. Thus, no gap is formed between the inner circumferential surface of the inner hole 48a of the inorganic fiber blanket layered body 48, 48' and the outer circumferential surface of the roller shaft portion, and accordingly, the intra-furnace gas is sufficiently prevented from flowing out.

Alumina fiber needle blankets are preferable as the alumina fiber blankets used for the present invention. The alumina fiber needle blankets are preferable because removal of the alumina fiber blankets is unlikely to occur.

The density of needle marks in the alumina fiber needle blankets used for the present invention, that is, the number of needle marks per unit area (1 cm$^2$) of a mat surface is, as an average in the entirety of the mat surface, 1.0 to 50.0 marks/cm$^2$, preferably 15.0 to 40.0 marks/cm$^2$, and especially preferably 20.0 to 35.0 marks/cm$^2$. As a calculation method of the needle marks, an alumina fiber needle blanket is cut into a square of 50×50 mm, one of the surfaces of the sample is irradiated with visible light, and the shades of the needle marks projected on the other surface are dotted with a marking pen. The number of the dots is counted to calculate the density of the needle marks.

Under the measurement conditions as described below, the maximum load for the inorganic fiber blankets such as an alumina fiber blankets used for the present invention is preferably 5.0 kgf or greater, more preferably 6.5 kgf or greater, further more preferably 8.0 kgf or greater, and especially preferably 8.5 kgf or greater. When the maximum load for the inorganic fiber blankets is within the above-described ranges, durability against external forces such as runout of the roller is obtained. As a result, it is preferable because a gap is unlikely to be formed between the roller and the roller shaft portion thermal insulation member.

[The Measurement Conditions]

A penetrated portion is formed, with a cork borer (inner diameter of 14 mm), at a position 40 mm from a distal end in a laterally central portion of an inorganic blanket sample (210 mm in length and 80 mm in width), a bar having an inner diameter of 12 mm is inserted through the penetrated portion, a side end surface farther away from the penetrated portion is secured, and a load at which the sample breaks (maximum load) is measured when the bar is moved upward in the longitudinal direction of the sample while the bar is maintained in the horizontal direction.

Under the measurement conditions as described below, a lubricant absorption height of the inorganic fiber blankets such as an alumina fiber blankets used for the present invention is preferably 9.5 mm or smaller, more preferably 8.5 mm or smaller, and especially preferably 8.0 mm or smaller. When the lubricant absorption height of the inorganic fiber blankets is within the above-described ranges, lubricant leaking through the roller bearing is gradually absorbed. This is preferable because the amount of the lubricant flowing into the inside of the furnace can be reduced.

[The Measurement Conditions]

A sample of the inorganic fiber blankets having a size of 120 mm in length and 20 mm in width is immersed for 90 seconds into a lubricant (type number ISOVG68, manufactured by AZ CO., LTD.) such that an end surface of the sample is 20 mm below the liquid level. After the sample has been collected, the distance between the immersed end surface and an uppermost portion of a lubricant absorbing position is measured.

The above-described embodiment is an example of the present invention, and the present invention may have a different form from the above description.

EXAMPLES

<Measurement Methods>

[The Remaining Thickness after the Cycle Testing at 1000° C.]

A plurality of samples having a size of 10 mm in length and 50 mm in width cut out from an inorganic blanket were adjusted, arranged such that cut end surfaces of the samples face outward, and sewn with an alumina thread. Thus, an integrated sample (45 mm in length×50 mm in width×10 mm in height) was fabricated. The sample was compressed for 30 minutes with the height of the sample set to 8.25 mm. Then, the temperature of upper and lower plates was increased to 1000° C. and compression from a height of 9.5 mm (release side) to a height of 7 mm (compressed side) was repeated 800 times. The remaining thickness before and after the measurement was used to calculate the percentage (%) of the thickness of the inorganic fiber blanket after the measurement relative to the thickness of the inorganic fiber blanket before the measurement.

[The Measurement of the Mullite Crystallization Rate]

A measurement sample was ground in a mortar, this measurement sample was measured at a tube voltage of 30 kv, a tube current of 40 mA, and a speed of 4°/minute by using an X-ray diffraction instrument (manufactured by Rigaku Corporation), and the peak height h at a peak of mullite 2θ =26.3° was read. Furthermore, a fiber obtained by heat treating an alumina fiber derived from an alumina fiber blanket (alumina:silica=72:28, mullite crystallization rate of 68%, MAFTEK (registered trademark) manufactured by Mitsubishi Chemical Corporation) at 1500° C. for 8 hours was measured as a reference item under the same conditions as those for the measurement sample, and the peak height $h_0$ at a peak of 2θ=26.3° was read. The mullite crystallization rate at this time is a value represented by the following expression.

$$\text{mullite crystallization rate} = h/h_0$$

[The Maximum Load for the Inorganic Fiber Blankets]

A penetrated portion was formed, with a cork borer (inner diameter of 14 mm), at a position 40 mm from a distal end in a laterally central portion of an inorganic blanket sample (210 mm in length and 80 mm in width), a bar having an inner diameter of 12 mm was inserted through the penetrated portion, a side end surface farther away from the penetrated portion was secured, and a load at which the sample breaks (maximum load) was measured when the bar was moved upward in the longitudinal direction of the sample while the bar was maintained in the horizontal direction.

[The Absorption Height of the Lubricant]

A sample of the inorganic fiber blankets having a size of 120 mm in length and 20 mm in width was immersed for 90 seconds into a lubricant (type number ISOVG68, manufactured by AZ CO., LTD.) such that an end surface of the sample is 20 mm below the liquid level. After the sample had been collected, the distance between the immersed end surface and an uppermost portion of a lubricant absorbing position was measured.

Example 1

An alumina fiber blanket 1 (trade name: MAFTEK (registered trademark), manufactured by Mitsubishi Chemical Corporation, alumina:silica=72:28, mullite crystallization rate of 1.5%, basis weight of 1500 g/m$^2$) was measured in accordance with the above-described measurement method. The results are provided in Table 1.

Example 2

An alumina fiber blanket 2 (trade name: MAFTEK (registered trademark), manufactured by Mitsubishi Chemical Corporation, alumina:silica=72:28, mullite crystallization rate of 70.8%, basis weight of 1600 g/m$^2$) was measured in accordance with the above-described measurement method. The results are provided in Table 1.

Example 3

An alumina fiber blanket 3 (alumina:silica=80:20, mullite crystallization rate of 50.0%, basis weight of 1600 g/m$^2$) was measured in accordance with the above-described measurement method. The results are provided in Table 1.

Comparative Example 1

An amorphous fiber blanket 3 (alumina:silica:zirconia=35.5:49:15, basis weight of 2000 g/m$^2$) was measured in accordance with the above-described measurement method. The results are provided in Table 1. Since the fiber of a silica fiber blanket 3 is an amorphous fiber, the mullite crystallization rate cannot be measured.

TABLE 1

| | Content ratio (alumina:silica:zirconia) | Mullite crystallization rate (%) | Remaining thickness (mm) | Maximum load (kgf) | Lubricant absorption height (mm) |
|---|---|---|---|---|---|
| Example 1 | 72:28:0 | 1.5 | 100 | 8.8 | 7.5 |
| Example 2 | 72:28:0 | 70.8 | 95.4 | 8.3 | 8.5 |
| Example 3 | 80:20:0 | 50.0 | 84.5 | 2.4 | 11.0 |
| Comparative example 1 | 35.5:49:15 | — | 69.1 | 0.8 | 9.8 |

Although the present invention has been described in detail with the specific forms, it is clear for one skilled in the art that various change can be made without departing from the intention and scope of the present invention.

The present application is based on Japanese Patent Application No. 2018-019476 filed on Feb. 6, 2018, the entire contents of which are incorporated herein by reference.

REFERENCE SIGNS LIST 1 continuous annealing furnace
2 roller
2b roller shaft portion
3 bearing
4 roller support member
10 furnace body
20 liner block
21 outer steel shell
21a seat plate
22 ceramic fiber liner
23 roller insertion hole
30 cylindrical cover
31, 32 flange
40 roller shaft portion thermal insulation member
41 casing
41a drum portion
41b flange portion
41c stopper portion
42 inorganic fiber blanket
43 holding ring
48, 48' inorganic fiber blanket layered body
50 fastening band
51 fastening rod

The invention claimed is:

1. A roller shaft portion thermal insulation member for a continuous annealing furnace provided between a roller insertion hole and a roller bearing of the continuous annealing furnace, the roller shaft portion thermal insulation member comprising:
at least one inorganic fiber blanket which is in contact with an outer circumferential surface of a roller or which is disposed near the outer circumferential surface of the roller, in which a percentage content of a shot of size 45 μm or greater is 3% or less; and
a casing that is coupled to a furnace wall or a roller bearing support member and that includes a drum portion which surrounds the outer circumferential surface of the roller,
wherein a remaining thickness of the at least one inorganic fiber blanket after cycle testing at 1000° C. is 70% or greater,
the at least one inorganic fiber blanket is held along an inner circumferential surface of the drum portion of the casing,
the at least one inorganic fiber blanket includes a plurality of inorganic fiber blankets, wherein
each of the plurality of inorganic fiber blankets has a plate shape,
the plurality of inorganic fiber blankets are arranged in a circumferential direction along the inner circumferential surface of the drum portion such that a plate surface of each of the plurality of inorganic fiber blankets is set in a direction parallel to an axial direction of the drum portion, and
the casing includes a fastening mechanism that adjusts a distance between a roller shaft and the roller shaft portion thermal insulation member.

2. The roller shaft portion thermal insulation member according to claim 1, wherein a maximum load for the at least one inorganic fiber blanketis 5.0 kgf or greater under following measurement conditions:

a penetrated portion is formed, with a cork borer having an inner diameter of 14 mm, at a position 40 mm from a distal end in a laterally central portion of a sample of the inorganic blanket having a size of 210 mm in length and 80 mm in width, a bar having an inner diameter of 12 mm is inserted through the penetrated portion, a side end surface farther away from the penetrated portion is secured, and a load at which the sample breaks, which is the maximum load, is measured when the bar is moved upward in a longitudinal direction of the sample while the bar is maintained in a horizontal direction.

3. The roller shaft portion thermal insulation member according to claim 1, wherein the at least one inorganic fiber blanket is at least one alumina fiber blanket.

4. The roller shaft portion thermal insulation member according to claim 3, wherein a mullite crystallization rate of an alumina fiber included in the at least one alumina fiber blanket is 85% or smaller.

5. The roller shaft portion thermal insulation member according to claim 1, wherein the at least one inorganic fiber blanket includes a plurality of the inorganic fiber blankets, each of the plurality of inorganic fiber blankets has a ring shape, and the plurality of ring-shaped inorganic fiber blankets that are coaxially layered are attached to the casing.

* * * * *